United States Patent [19]

Horii et al.

[11] Patent Number: 4,684,296

[45] Date of Patent: Aug. 4, 1987

[54] METHOD AND APPARATUS FOR THE GENERATION AND UTILIZATION OF A SPIRAL GAS STREAM IN A PIPELINE

[75] Inventors: Kiyoshi Horii; Toshiaki Murata, both of Tokyo, Japan

[73] Assignee: Kiyoshi Horii, Tokyo, Japan

[21] Appl. No.: 924,185

[22] Filed: Oct. 24, 1986

Related U.S. Application Data

[63] Continuation of Ser. No. 635,822, Jul. 30, 1984, abandoned.

[30] Foreign Application Priority Data

| Aug. 1, 1983 | [JP] | Japan | 58-139338 |
| Aug. 5, 1983 | [JP] | Japan | 58-142601 |
| Aug. 24, 1983 | [JP] | Japan | 58-153150 |
| Aug. 24, 1983 | [JP] | Japan | 58-153151 |

[51] Int. Cl.$^4$ ............................................. B65G 53/42
[52] U.S. Cl. ........................................ 406/153; 137/1; 137/808; 406/92; 406/194; 51/436; 239/405; 239/463
[58] Field of Search ................................. 406/92–95, 406/61, 194, 153; 137/1, 808; 51/321, 428, 436; 239/405, 463, 11

[56] References Cited

U.S. PATENT DOCUMENTS

| 1,614,713 | 1/1927 | Caracristi | 406/61 X |
| 2,244,050 | 6/1941 | Cassiere | 406/93 X |
| 2,315,079 | 3/1943 | Reeves | 406/93 X |
| 3,973,802 | 8/1976 | Kwon et al. | 406/33 |
| 4,097,092 | 6/1978 | Lapple | 406/93 |

*Primary Examiner*—Jeffrey V. Nase
*Attorney, Agent, or Firm*—Cushman, Darby & Cushman

[57] ABSTRACT

Uniform flow of gas flowing in a cylinder having inner diameter larger than that of a pipeline is introduced through a funnelform reducer into the inlet of the pipeline, where uniform flow of gas turned to a spiral gas stream by bringing to the mean gas stream velocity faster than 20 meter per second there. When solid particles are introduced into the spiral gas strem zone, they are transported to the outlet of the pipeline. A compressed gas layer is formed along the inside wall of the pipeline by the spiral motion of gas stream, and the layer prevents the direct contact of the solid particles to the inside wall of the pipeline which causes the erosion of the pipeline. As the center part of the cross section of the pipeline becomes very low pressure, especially along the axis of the pipeline, solid particles containing or accompanying volatile matters are desiccated or concentrated as a result of the evaporation of volatile matters while being transported in the pipeline. When grinding powder (abrasive) is transported by the spiral gas stream and spattered on an object, the surface of the object is ground without consumption of much energy.

5 Claims, 5 Drawing Figures

METHOD AND APPARATUS FOR THE GENERATION AND UTILIZATION OF A SPIRAL GAS STREAM IN A PIPELINE

This is a continuation of application Ser. No. 635,822, filed July 30, 1984, which was abandoned upon the filing hereof.

BACKGROUND OF THE INVENTION

1. Field of the Invention

This invention relates to a method and an apparatus for the generation of a spiral gas stream in a pipeline, and methods and apparatus for the utilization of the spiral gas stream thus generated for the transportation of solid particles and for other purposes.

2. Description of the Prior Art

It has been widely applied for a long time in industry to transport particles of various solids, including coal, ore and cement, by gas stream in pipeline.

The fundamental principle of this transportation method is very simple: Pressurized gas is fed into a pipeline to form a high-speed gas stream, in which solid particles are suspended and transported to the outlet of the pipeline. To avoid the sedimentation of solid particles which cause the blockade of the pipeline on the midway, it is inevitable to keep the velocity of gas stream in the pipeline at high level. In general, solid particles of larger size and higher specific gravity require the higher velocity of gas stream.

Consequently, the gas pressure at the inlet of the pipeline should be higher as the size and the specific gravity of the solid particles as well as the length of the pipeline increase. The gas pressure applied to high pressure pneumatic transportation system ranges usually from 2 to 7 $Kg/cm^2G$.

Several points have been raised in this conventional transportation system. The first point consists in a fact that a feeder for supplying solid particles into the pipeline is exposed to high gas pressure.

Usually, a screw conveyor functions as such a feeder as this, especially because a screw conveyor makes it easy to control quantitatively the amount of solid particles to be supplied, but from the structural point of view, a screw conveyor is deficient in gas sealing property. Pressurized gas at the inlet of the pipeline can blow back in the screw conveyor to form voids in the solid particles there. Not only such voids lower the conveyor's supply efficiency and make it difficult to control quantitatively the amount of solid particles to be supplied, but also the blow backed fine solid particles enter into the bearings of rotating part in the conveyor to wear rapidly the shafts and bearings. In addition, the hopper for feeding solid particles to the screw conveyor must be also air-tight. Consequently, when such a hopper becomes empty, it is necessary to interrupt the transportation of solid particles for the purpose of recharging it or to change over to another hopper.

To eliminate such difficulties as mentioned above, several devices for preventing possible blow back of gas by means of improved structure of a screw conveyor have been proposed in U.S. Pat. Nos. 3,602,552 and 3,975,058 etc., but as a result the structure becomes at any rate complicated.

The second point in the conventional transportation system of solid particles with high-speed gas stream in a pipeline is wear of the inside wall of the pipeline due to collision of solid particles. When the velocity of gas stream is sufficient to transport solid particles of high specific gravity, the gas stream in pipeline forms a turbulent flow, and the solid particles suspended in this violently collide against the inside wall of the pipeline also under turbulent condition, and if the solid particles are highly hard, the particles will wear the inside wall of the pipeline as if sandblasting does and finally piece the pipe wall. This phenomenon is remarkable especially in the bend zones of pipeline.

Since this problem is not yet effectively solved, it is inevitable to repair or exchange for new parts with such a high frequency as once a month for the bend zones of pipeline transporting pneumatically such highly hard solid particles as ore.

SUMMARY OF THE INVENTION

An object of this invention is to provide a method and an apparatus for the generation of a stable spiral gas stream in a pipeline. Another object of this invention is to provide a method and an apparatus for the transportation of solid particles in a pipeline which eliminates the wear and tear problem of the inside wall of the pipeline by utilizing a spiral gas stream. Further object of this invention is to provide a method for the transportation of solid particles with lower gas pressure and thus reduce the problem caused by the blow back of gas stream toward the feed line of solid particles. Further object of this invention is to provide a method for the desiccation or concentration of solid particles containing or accompanying volatile matters by utilizing a spiral gas stream in a pipeline. Further object of this invention is to provide a method for the grinding of the surface of an object by spattering grinding powder which has been transported by a spiral gas stream in a pipeline upon the surface of an object.

A spiral gas stream is generated in a pipeline by introducing a uniform flow of gas in a cylinder having inner diameter larger than that of the pipeline through a funnelform reducer into the inlet of the pipeline and bringing the mean gas stream velocity in the pipeline to that faster than 20 meter per second. When solid particles are introduced in the spiral gas stream zone thus generated, the solid particles are suspended in the spiral gas stream and transported to the outlet of the pipeline without any contact with the inside wall of the pipeline. Furthermore, the zone near the axis of the spiral gas stream becomes very low pressure, and evaporation of volatile matters takes place when solid particles containing or accompanying volatile matters are introduced in the spiral gas stream zone. This invention includes the utilization of such a character of spiral gas stream.

DETAILED DESCRIPTION OF THE PREFERRED EMBODIMENTS

Figure 1:
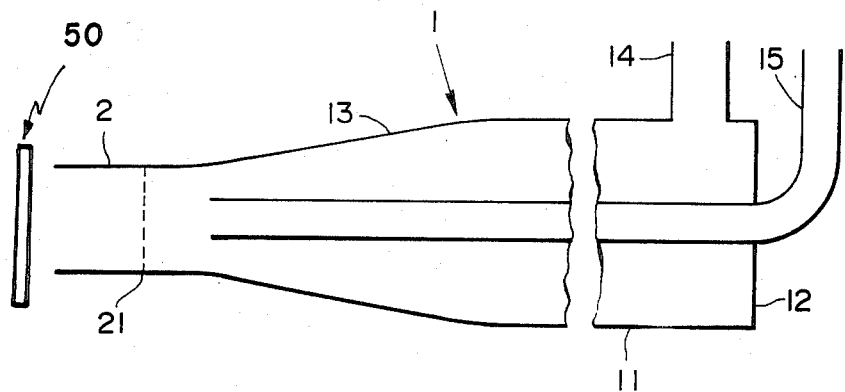
FIG. 1 is a sectional side view of an apparatus for the generation of a spiral gas stream in a pipeline according to the present invention.

In its various particular forms, a spiral gas stream widely appears in the nature. Some examples of it are as follows: tornado, sand pillar in a desert, eye of a typhoon, whirlwind etc.

However, the formation and the utilization of spiral gas stream in a pipeline has neither been industrially taken into consideration nor developed so far.

It is well known that a tornado, which often occurs in the central part of the North American continent, can suck up into the air even cattle, automobile and house, which will fall then at different spots on the ground and cause a tremendous damage. Though neither so powerful nor of large scale, a similar phenomenon can occur also in Japan: This is the so-called Kai-U (miraculous rain) phenomenon, in which grains, fishes, frogs etc. are sucked up and fall at different spots on the ground. A convincing interpretation of this phenomenon is that it is caused by a wind-spout, that is, the Japanese tornado.

Since such a natural phenomenon as this occurs at an unexpected spot on the ground and at an unexpected moment, it can only cause a disaster, but if it is possible to stabilize the existence of a similar phenomenon as a "Field" between the specified spots, material can be transported by this means among these spots. This invention provides a method for achieving this object.

It is generally adopted that a circular gas stream is artificially generated by feeding gas stream at a high velocity into a cylinder in a direction tangential to its circumference, and this principle is applied to a cyclone etc.

At first the inventors investigated this method, but it has been discovered that even if a spiral gas stream is formed near its feeding part by the method, the spiral gas stream gradually disappears in a longer pipeline so that it cannot be maintained stably.

The essence of a tornado is a mass of air stream, which ascends when its specific gravity decreased as a result of its warming, and the atmospheric pressure at the central part of the mass becomes lower as the ascending velocity increases. Air flows into this low pressure region, and the mass of air stream begins to rotate by this blowing-in air, then centrifugal force caused by its rotation decreases further the pressure of the central part and more air is drawn toward the part to accelerate the rotation.

Though tornado is a rising stream of warmed air, is it possible to generate similarly a spiral gas stream by feeding air compulsively into a pipeline at a high velocity? If air is fed under the condition generally applied industrially to pneumatic transportation etc., that is, compressed air is fed into a pipeline through a valve etc. in a condition with its pressure difference similarly to adiabatic expansion, only a turbulent flow appears and any stable spiral gas stream does not.

From an observation of the structure of tornado and sand pillar in a desert, it can be seen that its part near the ground surface has a funnel-like form. By reproducing such a condition as this, the present invention generates a spiral gas stream in a pipeline, that is, a gas flow, which proceeds in the pipeline while individual gas molecules circulating spirally.

A spiral gas stream is generated in a pipeline by introducing a uniform flow of gas flowing in a cylinder having inner diameter larger than that of the pipeline through a funnelform reducer into the inlet of the pipeline and bringing the mean gas stream velocity in the pipeline to that faster than 20 m/sec.

In detail, a uniform flow of gas flowing in a cylinder means a piston flow of gas in a cylinder which only has a vector parallel to the axis of the cylinder and has not a vector to promote intentionally the rotation of the gas stream in the cylinder. Neither abrupt expansion nor shrinkage of gas stream at the inlet of the feed gas to the cylinder from the outside gas sauce nor the pulsation of gas pressure of the outside gas sauce is preferable.

The uniform flow of gas is then introduced into the inlet of a pipeline through a funnelform reducer which is connected to one end of the cylinder and making the diameter of the passage of the gas stream to reduce to the diameter equal to that of the pipeline smoothly.

Figure 2:
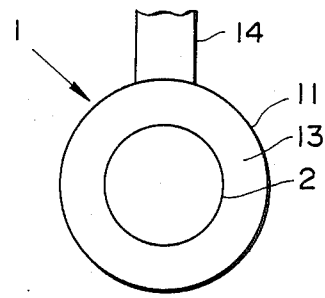
FIG. 2 is an outside view of the apparatus from the pipeline side.

FIG. 1 shows a sectional side view of basic structure of a spiral gas stream generator used in this invention and FIG. 2 shows the outside view of the spiral gas stream generator from the pipeline side. The spiral gas stream generator (1) is comprised of a cylinder (11) which has inner diameter larger than that of the pipeline (2), a bottom plate (12) which is attached to one end of the cylinder to close that end, a funnelform reducer (13) which is connected to the other end of the cylinder so as to reduce the inner diameter of the cylinder equal to the inner diameter of the pipeline smoothly and a feed gas inlet pipe (14) which is installed at the side of the cylinder so as to cause the flow line of the feed gas to cross the axis of the cylinder.

A feed gas from the outside sauce is introduced into the cylinder (11) through the feed gas inlet pipe (14), and the pulsation and turbulence of gas flow in the cylinder which has been caused by the introduction of feed gas into the cylinder (11) from the outside sauce gradually disappears as the gas flows in the cylinder toward the funnelform reducer (13), and the gas stream in the cylinder finally becomes a uniform flow of gas which has only a vector parallel to the axis of the cylinder, then flows into the funnelform reducer (13).

The reason to install the feed gas inlet pipe (14) at the side of the cylinder so as to cause the flow line of the feed gas to cross the axis of the cylinder is to avoid the generation of a vector to promote the rotation of gas stream in the cylinder. The funnelform reducer (13) reduces the inner diameter of the cylinder equal to the inner diameter of the pipeline smoothly, and the uniform flow of gas which has flown into the funnelform reducer from the cylinder gradually increases its mean gas stream velocity and finally reaches to an mean gas stream velocity sufficient to generate a spiral gas stream and introduced into the inlet (21) of the pipeline (2).

In order to make the flow of gas in the cylinder streamlined to a uniform flow, it is desirable to keep the mean gas stream velocity in the cylinder under 10 m/sec. Therefore the size of the inner diameter of the cylinder is to be decided in consideration of the gas volume to be handled.

The shape of the cross section of the cylinder is not necessarily a perfect circle. It may be a polygon, but in this case the shape of the cross section of the funnelform reducer at the cylinder side must be matched to the shape of the cross section of the cylinder and the shape of the cross section of the reducer at the pipeline side must be a circle having a inner diameter same as that of the pipeline.

The funnelform reducer is to make the uniform flow of gas in the cylinder to flow into the inlet of the pipeline without any abrupt change of the flow line of the gas stream and to give a sufficient gas velocity necessary to generate a spiral gas stream in the pipeline. As mentioned above, it is necessary to bring the mean gas stream velocity in the pipeline to that faster than 20 m/sec. to generate a spiral gas stream in a pipeline. In some cases, from the standpoint of the utilization of the spiral gas stream, it is required to maintain the mean gas stream velocity of 100 m/sec. or more in a pipeline. In such cases, if the funnelform reducer is designed to have a ratio of the cross sectional area at the cylinder side to that at the pipeline side is 20:1, the mean gas stream velocity in the cylinder may remain one twentieth of the mean gas stream velocity in the pipeline, for example, 5 m/sec. which is slow enough to avoid a turbulent flow in the cylinder. The shape of the side line of the reducer may be a curve as shown in FIG. 1, and also may be a straight line that makes the reducer as a part of a cone.

The number of the feed gas inlet pipe is not limited only one. It may be two or more, but in such cases it is preferable to install them at symmetrical or balanced positions. In any case, it must be avoided to install them to promote the rotation of gas stream.

The feed gas to be supplied to this apparatus is needed to have pulsation as little as possible. As high gas pressure is not necessary for the generation of a spiral gas stream, it is preferable to use a gas blower to feed the gas rather than to use a compressor with reciprocating movement.

Air is the most general gas sauce to be used as the feed gas, but if necessary, nitrogen, hydrogen and other gases could be used as the feed gas, and even a vapor of liquid could be used provided that the whole system is maintained at a temperature higher than the boiling point of the liquid.

When a uniform flow of gas flowing in a cylinder is introduced into the inlet of a pipeline through a funnelform reducer, it is expected that the gas flows in the pipeline keeping the streamlined piston flow state. However, it is observed that a spiral gas stream is generated in the pipeline when the mean gas stream velocity in the pipeline exceed 20 meter per second. Under this condition, a spiral gas stream, that means a flow of gas in which individual gas molecule proceeds toward the outlet of the pipeline while circulating around the axis of the pipeline, is generated in the pipeline. When the outlet of the pipeline is opened to the atmosphere, the gas pressure at the inlet of the pipeline does not exceed 1 Kg/cm$^2$G.

Of course it is impossible to observe directly a spiral gas stream itself with the naked eye because of its gaseous state, but the existence of a spiral gas stream can be confirmed from the Example 1 and 2 to be described in the following.

A stable spiral gas stream, generated by this invention possesses a material transporting capability in the same manner as a tornado. If a material is supplied to the spiral gas stream zone in the pipeline, the material is transported to the outlet of the pipeline with spiral movement itself too. As a special case, a material supplied just in the pipeline axis is transported straightforward to the outlet of the pipeline at a very high velocity.

To feed materials into the spiral gas stream zone, a feed pipe (15) is inserted into the cylinder (11) from the center of the bottom plate (12) along the axis of the cylinder and extended toward the reducer part as shown in FIG. 1. Solid particles are fed into the spiral gas stream zone through the feed pipe using a screw conveyor or other same kind of apparatus. In such a case, care must be taken about the gas seal so as not to flow the gas reversely into the feed pipe from the spiral gas stream generation zone as it disturbs the generation of the spiral gas stream itself.

EXAMPLE 1

Figure 3:
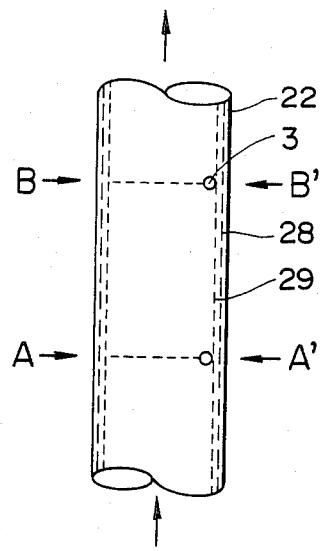
FIG. 3 shows a vertical transparent plastic tube used to demonstrate the existence of a spiral gas stream in it in Example 2.
Figure 4:
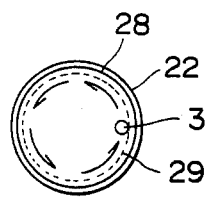
FIG. 4 is the cross sectional view of the plastic tube at A—A' level shown in FIG. 3.

As shown in FIG. 3, transparent plastic tube (made of polyvinylchloride resin) with inner diameter of 1.5 inch 3.8 cm), having a vertical part (22), was set and an air stream which had been introduced into the inlet of the tube through a spiral gas stream generator (1) as shown in FIG. 1 was flown upward at vertical part. When a plastic resin pellet (3) (cylindrical shape, diameter 5 mm, length 5 mm) was supplied from the feed pipe (15) of the spiral gas generator (1) shown in FIG. 1, the pellet was immediately passed through the vertical part of the tube, if gas velocity was enough fast. However, when the upward vector was well balanced with the downward vector of gravity by adjusting the gas velocity, the pellet was suspended at a certain level of the vertical tube, for example, at A—A' level in FIG. 3 and circulating motion of the pellet on the constant level was observed with the naked eye. That is, as shown in FIG. 4, which is the cross section view of A—A' part of FIG. 3, circulating motion of the pellet as indicated by arrow mark was observed.

When we narrowed the A—A' part of the tube by hand squeezing, the pellet moved up to the somewhat higher part B—B' and continued the circulating motion on that level. It is notable that the pellet (3) was not directly contacted with the inside wall (28) of the tube. It is explained that a compressed gas layer (29) was formed along the inside wall (28) of the tube by centrifugal power of the spiral motion of the gas stream and separated the pellet from the inside wall of the tube. Thickness of the shaped compressed gas layer (29) is drawn rather exaggeratedly in the attached FIGS. 3 and 4, but in actual it would be less than 1 mm, presumably that of micron order. That is, the pellet was continuing on the circulating motion along the inside of the compressed gas layer (29), keeping well balanced state of the upward vector by the spiral gas stream and the downward vector by gravity. It would be well understood that if gas velocity was increased out of such a balanced state, the pellet would move up to the outlet direction, keeping its circulating motion. When the vertical tube was slowly inclined, the pellet which had been in circulating motion at certain level in the vertical tube begun to move up, keeping the circulating motion (that is, a spiral motion with short pitch) and moved up quickly in the tube and went out of sight when the inclination angle of the tube reached to some extent.

EXAMPLE 2

200 m length pipeline composed of transparent plastic tube (made of polyvinylchloride resin) with inner diameter of 1.5 inch and its outlet was opened to the atmosphere was installed. The pipeline had some bending parts and up and down on the way. An apparatus as shown in FIG. 1 was put at the inlet of the pipeline and air was introduced in it so as to get 26 m/sec of mean gas stream velocity in the pipeline. Air pressure at the inlet of the pipeline was 0.1 Kg/cm$^2$G. In such a condition, plastic resin pellets as used in Example 1 were supplied continuously through the feed pipe (15) inserted into the apparatus from its bottom plate along the axis of the cylinder. Spiral motion of the pellets moving toward the outlet of the pipeline was observed with the naked eye when the midway part of the pipeline was flashed with a stroboscope.

It was observed too that pellets moving on near the center of the tube moved toward the outlet of the pipeline faster than that of closer to the inside wall of the tube, and the former left the latter behind.

In spite of the repeated experiments using this pipeline, the inside wall of the soft plastic tube was scratched little and remained transparent as that of new one. It indicates that the pellets had not contacted with the inside wall of the tube directly.

As we can see clearly in the above Examples, a stable spiral gas stream is generated inside the pipeline by this invention. When we projected the spiral gas stream motion on the cross sectional plane of the pipe, it will be a circular motion and inner part of gas is forced to come to outside by centrifugal power to make compressed gas layer at the closer part of inside wall of the pipe, and on the other hand rarefied gas zone is made in the center part of the pipe.

As can be seen in Example 2, gas velocity of the spiral stream in the direction of pipe axis becomes faster as is closer to the central part of the cross section of the pipe. On the other hand, gas density becomes lower as is closer to the central part of the pipe.

With relation to the unit quantity of passing gas molecules per unit area and unit time, in other word kinetic gas density will be higher as is closer to the central part of the cross section of the pipe.

It seems to be contradictory, thinking about the lower static gas density there, but you can easily understand it if you imagine about the number of passing cars running on the motorway is larger than that of congested road in downtown area.

It means there is different kind of concept about density between kinetic and static system. That is to say, kind of balancing state can be considered by a certain total quantity obtained by adding "Field" energy and kinetic energy there.

The reason why circular direction of vector is generated in the pipe, by only given axis direction of vector based on this invention, has not been reached to the level we could explain it enough theoretically and scientifically yet.

In the case of natural typhoon, it is often explained that upward stream of warmed air might be affected by the rotation force of the earth, but that kind of theory is not always adopted to this case. The direction of spiral motion, clockwise or counterclockwise, will not be always definite, (It is reported that tornado has both types of directions too).

At the present stage, all we can say are:

(1) Spiral gas stream is generated and keep on stable in a pipeline.

(2) Circular shaped compressed air of thin and motionless (concerning the direction of pipe axis) layer is formed along the inside wall of pipe by the centrifugal force of the spiral motion and certain kind of Coriolis effect.

(3) At the central part of the cross section of the pipe, gas pressure will be the lowest and the gas velocity in the direction of pipe axis will be the fastest inside the pipe.

When solid particles are fed in this spiral gas stream zone, they are transported in the pipeline passing through the low gas density part, moving spirally too. Inside wall of the pipe is protected by the compressed gas layer from the direct contact of coarse solid particles.

We mentioned that the mean gas stream velocity faster than 20 m/sec. is the necessary condition to generate a spiral gas stream in a pipeline. Though 20 m/sec. is the lowest limit figure at which the existence of a spiral gas stream in a pipeline is confirmed by the motion of small amount of solid particles supplied in it in experimental scale, but in the case of an industrial scale, when much quantity of solid particles are supplied in it, it is likely to come out sedimentation of particles on the way. So it is preferable to adopt at least 10% higher velocity, 22 m/sec. or more in industrial application. Especially in the case of uprising pipeline, the more higher mean gas stream velocity is preferable. Faster the mean gas stream velocity takes, the more stable transportation will be realized even in the case of larger size or heavier weight solid particles, but on the other hand, much power will be required to introduce necessary gas volume.

As shown in Example 2, solid particles transported in the pipeline pass through either central part of the pipe or closer part of the inside wall of the pipe, which cause the different passing velocity and centrifugal power of each particles. Solid particles often change the course in the pipeline in the above meaning, which means different grades of "Field energy" might effect on each solid particles and happen to crush and pulverize them, especially when they are fragile ones. This phenomenon will be remarkable when the mean gas stream velocity is higher, and it would be utilized for the pulverization of solid particles rather than, or together with the transportation of them.

Another notable thing is the lower gas pressure originated by the spiral motion of gas in the pipeline. Especially in the central part of the circle, that is, along the axis of the pipeline almost vacuum state would be attained, where the volatile matters such as water which are contained in or accompanied with solid particles would be evaporated. It can be applied for the desiccation or concentration of solid particles containing or accompanying volatile matters rather than, or together with the transportation of them. Use of dried gas and longer retention time in the pipeline will be more helpful for the purpose. On the other hand humid gas can be used for keeping from desiccation of the solid particles.

In most cases, air is used as a carrier gas, but nitrogen or other inert gas can be used for special case such as foreseeable powder explosion.

For the industrial application of this solid particle transportation method by the spiral gas stream system, distance of transportation, head difference, size and weight of particles to be transported, required power and other conditions such as pulverizing or desiccating effect should be taken into consideration for the optimum operation. The diameter of pipeline is determined by the particle size and transportation quantity.

The pressure difference between inlet and outlet of the pipeline in the spiral gas stream system has been described before as at most 1 Kg/cm$^2$. In more detail, the pressure difference between inlet and outlet of the pipeline has a functional relation with pipe diameter, pipe length and mean gas stream velocity in essence. Roughly speaking, either double the pipe length or double the gas stream velocity makes double the pressure difference.

On the other hand, larger diameter of pipe makes smaller the pressure difference, it is reduced in inversely proportional to the square of pipe diameter while being in smaller pipe diameter, but will be less affected as it becomes larger.

For example, in the case of 20 cm of pipe diameter, 100 m of length, 25 m/sec. of the mean gas stream velocity and outlet of the pipeline is opened to the atmosphere, inlet pressure of the gas stream is about 0.05 $Kg/cm^2G$. In another case of 1.5 inch (3.8 cm) of pipe diameter, 200 m of length, 26 m/sec. of the mean gas stream velocity and outlet of pipe is opened to the atmosphere, the inlet pressure of gas stream was 0.1 $Kg/cm^2G$, as shown example 2.

It is imaginable to reach to more than 1 $Kg/cm^2$ of inlet pressure when pipeline is very long and pipe diameter is very small, but from what we have experienced, it seems 1 $Kg/cm^2$ of pressure difference is almost maximum limit to keep stable spiral gas stream in a pipeline. In other words, it will be unnecessary to use higher gas pressure than this to get spiral gas stream.

As load variation, change of outlet gas pressure or other hardly controllable factors must be taken into consideration in actual industrial operation, it is recommendable to design to get 0.7 $Kg/cm^2$ or less of pressure difference between inlet and outlet of pipeline for practical operation.

EXAMPLE 3

Using transparent plastic tube with 1.5 inch (3.8 cm) of inner diameter, 50 m length of pipeline whose outlet is opened to the atmosphere was installed and the transportation test was done using the plastic resin pellets as used in Example 2.

An apparatus as shown in FIG. 1 was connected at the inlet of the pipeline, and air was fed at the rate of 1.42 $Nm^3$/min. (the mean gas stream velocity 20.9 m/sec.) to generate spiral gas stream in the pipeline and pellets written above was supplied into the spiral gas stream zone by gradual increase up to 300 Kg/hr through feed pipe and transported to the outlet. Inlet gas pressure was 0.025 $Kg/cm^2G$ in the above conditions.

Design Model 1 and 2

Based of those data obtained by basic study using plastic tube with inner diameter of 1.5 inch (3.8 cm), industrial solid particle transportation system by spiral gas stream, using a pipeline with inner diameter of 8 inch (20.3 cm) and length of 100 m, was designed.

Design Model for transportation of coal having the particle size from 1 mm to 25 mm and specific gravity of 1.40 (Model 1) and having the particle size from 25 mm to 60 mm and specific gravity of 1.41 (Model 2) are shown in the following Table 1.

TABLE 1

|  | Model 1 | Model 2 |
| --- | --- | --- |
| Air flow quantity $Nm^3$/min. | 45.3 | 46.7 |
| Mean air velocity m/sec. | 24.0 | 24.8 |
| Air pressure $Kg/cm^2G$ | 0.09 | 0.1 |
| Transportation quantity Kg/min. | 2243 | 1647 |
| Ratio (particle/air)* | 38.4 | 27.3 |

*Ratio is shown in the following equation
$m = W/(Q \times 1.29)$
W : transportation quantity, Kg/min.
Q : air flow quantity, $Nm^3$/min.
1.29 : specific gravity of air at 0° C.

Booster

As described above, transportation distance by spiral gas stream system has practically maximum limit by the pressure difference between inlet and outlet of less than 1 $Kg/cm^2$.

Figure 5:
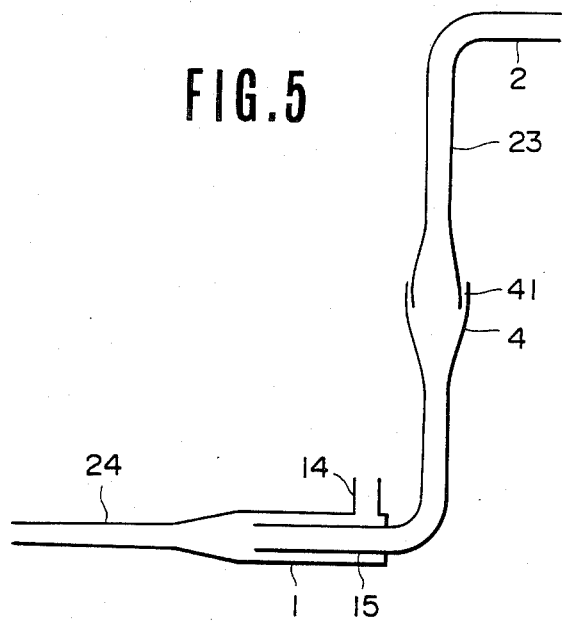
FIG. 5 shows a booster mechanism of the spiral gas stream in a pipeline.

So, for the transportation of longer distance, relay depot to connect two systems or booster in the midway of pipeline will be necessary. An example of booster mechanism is shown in FIG. 5. Solid particles transported by the spiral gas stream is passed through the pipe (2), of which end part is directed downward and forms the vertical dropping part (23) where a gas separator (4) having upward opening (41) is installed. Solid particles continue the spiral motion without suffering any effect by the opening (41), but some part of the gas which has consisted the spiral gas stream in the pipeline (2) is discharged to the atmosphere and the gas pressure in the gas separator (4) becomes roughly equal to the atmospheric pressure. Solid particles dropped with remaining part of the spiral gas stream is supplied to the feed pipe (15) of secondary spiral gas stream generator (1). This feed pipe is consisted of straight pipe, and setting of screw conveyor in it is unnecessary. Additional carrier gas is introduced in gas inlet pipe (14) of the secondary spiral gas stream generator and spiral gas stream generated there is introduced into the inlet of the secondary pipeline (24) to reinforce the spiral gas stream which has transported solid particles in the first pipeline. The object of installing the opening (41) of the gas separator (4) is to prevent the coming back of the gas pressure in the secondary spiral gas stream generator (1) to the first spiral gas stream generator connected at the inlet of pipe (2) and highten the gas pressure there. Air flow quantity discharged from the opening (41) of the gas separator is preferable to be about 10 to 20% of total quantity of air stream in the pipeline (2) and the additional air feed from the gas inlet pipe (14) is adjusted in such a quantity.

Reinforcement of transporting capability of solid particles in spiral gas stream system To transport larger size or heavier weight solid particles, or both of which solid particles, it is necessary to increase the mean gas stream velocity, which result in the higher power consumption to increase the gas pressure at the inlet of the pipeline.

In such a case, transporting capability of the spiral gas stream is reinforced by the intentional blending of heavier weight solid particles with lighter ones and larger size solid particles with smaller ones.

These smaller size or lighter weight solid particles mean the comparative expression to the original solid particles to be transported and not directly mean the absolute value to define.

The addition of these smaller size or lighter weight solid particles to the original ones helps to reinforce the spiral gas stream and the larger size or heavier weight solid particles are transported effectively. In other words, heavier weight or larger size solid particles will be able to be transported more easily and speedily by the spiral gas stream having the same mean spiral gas stream velocity by means of the blending of lighter weight particles or smaller size particles, and furthermore heavier weight or larger size solid particles which has been difficult to transport by the spiral gas stream becomes transportable by the spiral gas stream of the same condition.

This effective phenomenon is expressed not only on larger size or heavier weight solid particle side, but also on smaller size or lighter weight solid particle side. More of smaller size or lighter weight solid particles would be transported faster by the same spiral gas stream of the same condition, that is to say, both side will reinforce the transporting capability of the spiral gas stream interdependently.

The addition of smaller size or lighter weight particles to the original ones reinforce the spiral gas stream and the central part of the tube also comes to have high-energy, where larger size or heavier weight solid particles flown into there also help to reinforce the spiral gas stream again, it is considered.

It is not necessary to use special kind of method or apparatus for such an addition and it will be enough to only supply those blended particles to the feed pipe of solid particle.

EXAMPLE 4

The moving speed of solid particles was measured by using the tube standing upright, as it is too difficult to use the horizontal tube where moving speed of solid particles is too fast to measure. In transparent plastic resin tube of 1.5 inch inner diameter with vertical part (22) as shown in FIG. 3, spiral gas stream of air is introduced to flow upward there. Moving state of solid particles in the tube has brought to be observed by the naked eye by adjusting the mean gas stream velocity (quantity of air feed). Putting one piece of particle made of ceramic (a sphere of 5 mm diameter, specific gravity: 4.0,) into the inlet of the tube, its moving-up speed was measured as 7 seconds to rise up 50 cm distance in the vertical part of the tube. On the other hand, when one piece of ceramic particle together with 20 pieces of rice grains (specific gravity, 1.25) are put into the tube at the same time, keeping the mean gas stream velocity at the same above condition, it took 3 seconds to rise up the same height, 50 cm in the tube. Notwithstanding the same velocity of the gas stream, the reason why the moving-up speed of the ceramic particle increased in the latter case is attributable to the reinforcement of the spiral gas stream by adding rice grains to it.

On another occasion, when 20 grains of rice only were put into the tube, it took 2.0 seconds to rise up 50 cm, but when one piece of ceramic particle was added to it, time was shorten to 1.6 seconds to rise up the same distance.

So, it is understandable to have interdependent relation between larger size and smaller size particles existing together in the spiral gas stream and larger size particle is influenced more than smaller ones. In general, larger size or heavier weight solid particles can be transported in the reinforced spiral gas stream more effectively by adding smaller size or lighter weight solid particles to them.

EXAMPLE 5

By using the same method as shown in Example 4, the adding effect of the smaller particle of coal (1 mm diameter) to the larger ones (4 mm diameter) was evaluated. The required time of each cases to rise up 50 cm in the vertical tube were as follows:
2 particles of larger coal: 5.2 seconds
40 particles of smaller coal: 1.5 seconds
2 larger and 40 smaller particles,
 larger coal: 2.3 seconds
 smaller coal: 1.1 seconds Interdependent effect can be seen in the result, but it is worthy of our notice that the larger ones had been infulenced significantly.

Desiccation or concentration of solid particles containing or accompanying volatile matters During the transportation test described above, when wet powder or slurry containing or accompanying volatile matters such as water was fed into the spiral gas stream, a phenomenon of piling of dried or solidified material on the plate set at right angles to the stream near the outlet of the pipeline has been observed. It means that when spiral gas stream is generated in the pipeline according to the above mentioned method and putting the wet powder or slurry into it, dried powder or concentrated slurry are obtained at the outlet of the pipeline as volatile matters are evaporated in the pipeline during the transportation process. Thinking about the cause of this phenomenon, it must be reminded that at the inner part of the pipeline with a spiral gas stream, gas density becomes less and less as approaching to the axis of the pipeline and almost vacuum state in the center of the pipeline. So, the wet powder or slurry supplied in such a spiral gas stream zone is under reduced pressure state during the transportation process in the pipeline and desiccation or concentration comes out as evaporation of volatile matters proceeds.

As for the volatile matters contained or accompanied with the solid particles, whatever matters such as water and organic solvent would be evaporated in the low pressure atmosphere in the spiral gas stream zone. Even the water in a cell of organic tissue would be evaporated by the effect of osmotic pressure.

Under these circumstances, as the evaporated matters are dragged into the spiral gas stream and keep compressing and condensing to the inside wall of the pipe as well as the gas supplied from the inlet, evaporation makes steady progress throughout the pipeline. So, the length of the pipeline is long enough to give the retention time sufficient to evaporate most of the volatile matters, intense desiccation or concentration could be achieved. When opened the outlet of the pipeline to the space, dried solid is recovered as powder and concentrated material is recovered as wet powder or thick slurry.

Furthermore, when the gas stream from the outlet of the pipeline was blown upon a plate which had been placed substantially at right angles to the stream with some distance to the outlet of the pipeline, dried material was piled on the plate in more compact state than that of the case in which the gas stream was blown to the space. It means that solid particles collided and piled on the plate in almost vacuum atmosphere which is formed by the gas stream diffused in a cone shape out of the outlet of the pipeline, and piled particles combined each other to the compact cake without gas layer among the particles.

The minimum distance between the outlet of the pipeline and the plate will be less than 1 cm theoretically, but it is preferable to be more than 5 cm, thinking about so as not to affect the spiral motion of gas stream in the pipeline by back-flowing of the gas which is turned around by the plate or not to blockade the outlet with the piled material. The upper limit of the distance will be the length keeping the reduced pressure state of exhausted gas stream before diffusing out. Though it depends on the pipe-diameter and gas stream velocity and cannot be determined as a constant figure, it is preferable to be designed to take shorter distance, taking into consideration the volume of piling material and total size of equipment. The plate might be set to move parallel so as to bring out the piled material continuously or design of the plate might be selected freely such as one with multiple dented mold on it to produce tablets or pellets by scraping of the surplus material. The method of this invention can be applied not only above mentioned desiccating or concentrating process, but also for granulation of powder by adding volatile liquid such as water, organic solvent, adhesive or heavy oil mist as binder.

EXAMPLE 6

Rubber made hose for city water of 1.5 cm inner diameter and 2 m length was used as a pipeline. From a cylinder of 15 cm diameter, air was introduced into the hose through a funnelform reducer at a rate of 1.42 Nm$^3$/min. to form a spiral gas stream in the hose (the mean gas stream velocity, 134 m/sec.). In this occasion, air pressure at the inlet was 0.025 Kg/cm$^2$G. Mud containing 95–99% of water was supplied into the spiral gas stream zone from the inlet side of the rubber made hose and obtained the material containing 50% of water from the outlet of the pipeline. Using this material from the outlet, test was repeated again and obtained the one containing 30% of water.

EXAMPLE 7

The same test apparatus as in Example 6 was used placing the outlet part of the hose horizontally, and a glass plate was set perpendicularly aparting from the outlet of the hose by the distance of 5 cm. Air was introduced into the hose as the same condition as in Example 6. When coffee powder added 30% of water as binder was supplied into the spiral air stream zone, coffee powder was piled up on the glass plate at the outlet side as a caked material. Its Mose hardness was 1 to 2 and the moisture content was reduced to 15%.

EXAMPLE 8

Using the same apparatus and same conditions as in Example 7, coal powder of smaller than 200 mesh added 25 to 30% of heavy oil mist as a binder was supplied and coal powder was piled up on the glass plate at the outlet side. Its Mose hardness was 3 and the moisture content was 12 to 15%.

EXAMPLE 9

Using same apparatus and same conditions as in Example 7, soil of Kanto-Rohm layer added 30% of water was supplied and the soil was piled up on the glass plate at the outlet side. Its Mose hardness was 4 to 4.5 and moisture content was reduced to 5 to 6%.

Grinding of an object

So far, more well known application of Jet grinding has been sand blasting method in which grinding powder (abrasive) like sand is spattered by compressed air on the surface of an object to be ground, applying its collision energy to rust-removing or paint-removing. In such a method, it is necessary to give grinding powder enough kinetic energy and the required power to make high pressure compressed air will be big enough, but not always so efficient. Besides, spattered grinding powder is likely to disperse in a wide area which might cause some pollution problem around there and care must be taken to choose the place to apply. On the contrary, this method by this invention needs less energy and gives better grinding effect in comparison with conventional method.

EXAMPLE 10

Using the plastic tube described in Example 2, plastic pellets transported by the spiral air stream were sprayed against the gypsum board installed perpendicularly to the axis of the pipeline, 50 cm apart from the outlet. Scratched marks on the gypsum board showed that the pellets collided obliquely against it, which means that the pellets had been in spiral motion in the pipeline.

EXAMPLE 11

To confirm the grinding effect found in Example 10, sand blasting by this invention was tested. Into a rubber made hose for city water of 1.5 cm of inner diameter and 2 m of length, air was introduced at the rate of 1.42 m$^3$/min. from a cylinder of 15 cm diameter through a funnelform reducer, and a spiral gas stream of 134 m/sec. of mean gas stream velocity was generated in the rubber made hose. Air pressure at the inlet was 0.025 Kg/cm$^2$. 5 cm apart from the outlet of the hose, 20 cm×20 cm of transparent glass plate (shown as an exemplary object 50, in FIG. 1) on which 2 strips of vinyl made tape of 5 cm length and 1.8 cm width were put crosswise on the center was installed for sand blast test. 350 cc/2 min. of river sand for construction use was supplied to the inlet of the hose and the glass surface was ground in a round area of about 10 cm diameter like frosted glass except the part put the tape on it. The surface of the tapes was not suffered any damage and the glass plate under tapes was kept transparent. That is to say, sand spray did not hurt soft tape, but ground the hard glass surface, which can be applied to the glasswork with pattern or initial letters.

COMPARATIVE EXAMPLE 1

The same rubber made hose written in Example 11 was used and same quantity of air was applied. But the hose was connected with the pipe from air blower in the manner to change the diameter suddenly, by which connecting state, spiral gas stream did not generate. 350 cc of same river sand used in Example 11 was supplied from the inlet side and spattered onto the glass plate installed as the same manner as in Example 11. Test result was that glass plate was not ground at all. Despite the same rubber made hose, air quantity, sand quantity as in Example 11 and Comparative Example 1, and the same level of energy was given to the sand, remarkable difference came out to the result between two tests. It is presumed that the glass plate was ground in Example 11 because the sand collided obliquely to scrape into the surface by spiral motion given while transported in the hose. Furthermore, spinning motion of individual sand particle would have enhanced the effect. On the contrary, in the case of Comparative Example 1, sand was collided straightforward from the front with the glass surface, but did not have enough energy to hurt the glass surface by the air of as less as 0.025 Kg/cm$^2$, it is presumed.

As for the grinding powder, hard material such as carborundum, colundum or others can be chosen in accordance with the hardness of the surface to be ground.

As this method can be applied by the comparatively lower pressure air, apparatus will be simpler, less power consumption, more effective and less pollution problem due to less dispersion area of grinding powder during operation.

Needless to say, inside wall of the pipe, for example even such as rubber made hose in Example 11, is not ground at all as the grinding powder does not contact with the inside wall of pipe due to the compressed air layer made by the spiral motion of air stream. Simpler and handy apparatus of this invention is another advantage for operation.

What is claimed is:

1. A method for generation of a spiral gas stream in a pipeline which comprises the following steps:
    forming a uniform flow of gas in a cylinder with first and second ends, the first end adapted for connecting to a pipeline pipe, said second end being closed with a bottom plate and said cylinder having an inner diameter larger than that of said pipeline pipe, by introducing feed gas into said cylinder through a gas inlet pipe so as to make the flow line of the feed gas substantially intersect the longitudinal axis of the cylinder;
    bringing the mean gas flow velocity in said cylinder to a mean gas flow velocity less than 10 meters per second;
    introducing said uniform flow of gas flowing in said cylinder into the inlet of said pipeline pipe through a funnelform reducer connected at said first end of said cylinder; and
    bringing the mean gas stream velocity in the pipeline pipe to a mean velocity greater than 20 meters per second.

2. A method for the transportation of solid particles through a pipeline which comprises the following steps:
    forming a uniform flow of gas in a cylinder with first and second ends, the first end adapted for connecting to a pipeline pipe, said second end being closed with a bottom plate and said cylinder having an inner diameter larger than that of the pipeline pipe, by introducing feed gas into said cylinder through a gas inlet pipe so as to make the flow line of the feed gas substantially intersect the longitudinal axis of the cylinder;
    bringing the mean gas flow velocity in said cylinder to a mean gas flow velocity less than 10 meters per second;
    generating a spiral gas stream in said pipeline pipe by introducing said uniform flow of gas flowing in said cylinder into the inlet of said pipeline pipe through a funnelform reducer connected at said first end of said cylinder;
    bringing the mean gas stream velocity in said pipeline pipe to a mean velocity greater than 20 meters per second; and
    feeding solid particles into said spiral gas stream zone thus generated.

3. A method according to claim 2 wherein said solid particles are a mixture of larger size solid particles and smaller size solid particles.

4. A method according to claim 2 wherein said solid particles are a mixture of heavier weight solid particles and lighter weight solid particles.

5. A method for the desiccation or concentration of solid particles containing or accompanying volatile matter which comprises the following steps:
    forming a uniform flow of gas in a cylinder with first and second ends, the first end adapted for connecting to a pipeline pipe, said second end being closed with a bottom plate and said cylinder having an inner diameter larger than that of the pipeline pipe, by introducing feed gas into the cylinder through a gas inlet pipe so as to make the flow line of the feed gas substantially intersect the longitudinal axis of said cylinder;
    bringing the mean gas flow velocity in said cylinder to a mean gas flow velocity less than 10 meters per second;
    generating a spiral gas stream in said pipeline pipe by introducing said uniform flow of gas flowing in said cylinder into the inlet of said pipeline pipe through a funnelform reducer connected at said first end of said cylinder;
    bringing the mean gas stream velocity in said pipeline to a mean velocity greater than 20 meters per second; and
    feeding solid particles containing or accompanying volatile matter into said spiral gas stream zone thus generated.

* * * * *